United States Patent
Yonemura et al.

(10) Patent No.: US 12,152,602 B2
(45) Date of Patent: Nov. 26, 2024

(54) CENTRIFUGAL COMPRESSOR

(71) Applicant: IHI Corporation, Tokyo (JP)

(72) Inventors: Atsushi Yonemura, Tokyo (JP); Ryota Sakisaka, Tokyo (JP); Takashi Fujiwara, Tokyo (JP); Takahiro Bamba, Tokyo (JP)

(73) Assignee: IHI Corporation, Tokyo (JP)

( * ) Notice: Subject to any disclaimer, the term of this patent is extended or adjusted under 35 U.S.C. 154(b) by 85 days.

(21) Appl. No.: 17/643,934

(22) Filed: Dec. 13, 2021

(65) Prior Publication Data

US 2022/0099107 A1    Mar. 31, 2022

Related U.S. Application Data

(63) Continuation of application No. PCT/JP2020/032199, filed on Aug. 26, 2020.

(30) Foreign Application Priority Data

Oct. 9, 2019  (JP) .................................. 2019-185787

(51) Int. Cl.
    *F04D 29/42*      (2006.01)
    *F04D 17/10*      (2006.01)
    (Continued)

(52) U.S. Cl.
    CPC ........... *F04D 29/462* (2013.01); *F04D 17/10* (2013.01); *F04D 27/002* (2013.01);
    (Continued)

(58) Field of Classification Search
    CPC .... F04D 29/685; F04D 29/464; F04D 29/667; F04D 29/462; F04D 29/4213;
    (Continued)

(56) References Cited

U.S. PATENT DOCUMENTS 5,246,335 A * 9/1993 Mitsubori ........... F04D 29/4213
                                                   415/214.1
5,863,178 A * 1/1999 Scheinert ............ F04D 27/0215
                                                    415/58.4
(Continued)

FOREIGN PATENT DOCUMENTS

CN         202431613 U    9/2012
JP         06-185498 A    7/1994
(Continued)

OTHER PUBLICATIONS

International Search Report issued Oct. 13, 2020 in PCT/JP2020/032199 filed on Aug. 26, 2020, citing documents AP-AS therein, 4 pages (with English Translation).

*Primary Examiner* — Brian P Wolcott
*Assistant Examiner* — Behnoush Haghighian
(74) *Attorney, Agent, or Firm* — Oblon, McClelland, Maier & Neustadt, L.L.P.

(57) ABSTRACT

A centrifugal compressor includes: a housing including an intake flow path; a compressor impeller disposed in the intake flow path; a circulation flow path provided radially outside the intake flow path and connected to the intake flow path at a downstream position that radially faces the compressor impeller and at an upstream position that is upstream of the downstream position with respect to the compressor impeller; and a movable member disposed at the upstream position and including a body portion having a protruding portion, the movable member being movable between a protruding position where the circulation flow path is closed by the body portion and the protruding portion is located in the intake flow path, and a retracted position where the protruding portion is retracted from the intake flow path and the circulation flow path is connected to the intake flow path.

5 Claims, 9 Drawing Sheets

(51) Int. Cl.
  *F04D 27/00* (2006.01)
  *F04D 29/46* (2006.01)
  *F04D 27/02* (2006.01)
  *F04D 29/68* (2006.01)
(52) U.S. Cl.
  CPC ...... *F04D 29/4213* (2013.01); *F04D 27/0207* (2013.01); *F04D 27/0215* (2013.01); *F04D 27/0253* (2013.01); *F04D 29/464* (2013.01); *F04D 29/685* (2013.01)
(58) Field of Classification Search
  CPC .. F04D 29/444; F04D 27/002; F04D 27/0207; F04D 27/0215; F04D 27/0246; F04D 27/0253; F04D 27/023; F04D 27/0238; F01D 17/141; F01D 17/145; F01D 17/146
  See application file for complete search history.

(56) References Cited

U.S. PATENT DOCUMENTS

| | | | | |
|---|---|---|---|---|
| 6,634,174 | B2* | 10/2003 | Sumser | F02B 37/225 60/602 |
| 8,210,793 | B2* | 7/2012 | Hale | F04D 29/685 415/206 |
| 8,272,832 | B2* | 9/2012 | Yin | F04D 29/685 415/206 |
| 9,528,527 | B2* | 12/2016 | Sekularac | F04D 27/0215 |
| 9,732,756 | B2* | 8/2017 | An | F04D 29/462 |
| 9,771,856 | B2* | 9/2017 | Nakao | F04D 29/444 |
| 9,816,522 | B2* | 11/2017 | Zheng | F04D 29/4213 |
| 9,850,913 | B2* | 12/2017 | An | F04D 17/10 |
| 9,874,226 | B2* | 1/2018 | Fukuyama | F04D 27/0253 |
| 10,125,793 | B2* | 11/2018 | Tomita | F04D 29/4213 |
| 10,495,100 | B2* | 12/2019 | Mohtar | F04D 29/083 |
| 10,502,232 | B2* | 12/2019 | Mohtar | F04D 29/462 |
| 10,544,808 | B2* | 1/2020 | Mohtar | F16K 3/03 |
| 10,550,761 | B2* | 2/2020 | Lombard | F04D 29/4206 |
| 10,570,905 | B2* | 2/2020 | Mohtar | F04D 29/685 |
| 10,578,048 | B2* | 3/2020 | Styles | F04D 29/441 |
| 10,578,124 | B2* | 3/2020 | Zeng | F02B 37/24 |
| 10,584,719 | B2* | 3/2020 | Zeng | F02B 37/24 |
| 10,619,561 | B2* | 4/2020 | Lombard | F04D 29/464 |
| 10,774,676 | B2* | 9/2020 | Hu | F01D 17/165 |
| 10,774,677 | B2* | 9/2020 | Hu | F04D 27/0253 |
| 10,954,960 | B2* | 3/2021 | Wang | F04D 17/10 |
| 11,105,218 | B2* | 8/2021 | Karstadt | F04D 29/464 |
| 11,215,190 | B2* | 1/2022 | Fujiwara | F04D 29/464 |
| 11,248,629 | B2* | 2/2022 | Ueno | F02B 33/40 |
| 11,415,149 | B2* | 8/2022 | Karstadt | F04D 29/464 |
| 11,499,561 | B2* | 11/2022 | Sishtla | F04D 29/685 |
| 11,591,926 | B2* | 2/2023 | Stankevicius | F01D 25/24 |
| 2009/0060708 | A1* | 3/2009 | Hale | F04D 27/0215 415/206 |
| 2009/0263234 | A1* | 10/2009 | Yin | F04D 29/685 415/58.4 |
| 2015/0192133 | A1* | 7/2015 | An | F04D 29/4213 415/203 |
| 2015/0192147 | A1* | 7/2015 | An | F04D 29/685 415/58.4 |
| 2015/0198163 | A1 | 7/2015 | Lei et al. | |
| 2015/0337863 | A1* | 11/2015 | Tomita | F04D 29/667 415/58.4 |
| 2016/0201693 | A1* | 7/2016 | An | F04D 17/10 415/58.4 |
| 2017/0191502 | A1* | 7/2017 | Ozaki | F04D 29/624 |
| 2019/0048876 | A1* | 2/2019 | Mohtar | F04D 27/0207 |
| 2019/0078586 | A1* | 3/2019 | Zeng | F02B 37/24 |
| 2019/0078587 | A1* | 3/2019 | Zeng | F04D 27/002 |
| 2019/0136755 | A1* | 5/2019 | Lombard | F02C 6/12 |
| 2019/0178151 | A1* | 6/2019 | Smith | F04D 27/0253 |
| 2019/0218981 | A1* | 7/2019 | Styles | F02B 37/24 |
| 2019/0264604 | A1* | 8/2019 | Lombard | F04D 29/464 |
| 2019/0264710 | A1* | 8/2019 | Mohtar | F04D 29/464 |
| 2019/0271329 | A1* | 9/2019 | Mohtar | F04D 29/464 |
| 2019/0368373 | A1* | 12/2019 | Hu | F04D 27/0207 |
| 2019/0368374 | A1* | 12/2019 | Hu | F04D 29/685 |
| 2020/0011196 | A1* | 1/2020 | Karstadt | F02B 37/225 |
| 2022/0090514 | A1* | 3/2022 | Stankevicius | F01D 17/145 |

FOREIGN PATENT DOCUMENTS

| | | |
|---|---|---|
| JP | 2007-262971 A | 10/2007 |
| JP | 2009-167938 A | 7/2009 |
| JP | 2016-173051 A | 9/2016 |
| JP | 2018-168742 A | 11/2018 |
| WO | WO 2015/152510 A1 | 10/2015 |

\* cited by examiner

CENTRIFUGAL COMPRESSOR

CROSS REFERENCE TO RELATED APPLICATIONS

This application is a continuation application of International Application No. PCT/JP2020/032199, filed on Aug. 26, 2020, which claims priority to Japanese Patent Application No. 2019-185787, filed on Oct. 9, 2019, the entire contents of which are incorporated by reference herein.

BACKGROUND ART

Technical Field

The present disclosure relates to a centrifugal compressor.

A centrifugal compressor includes a compressor housing in which an intake flow path is formed. A compressor impeller is arranged in the intake flow path. When the flow rate of the air flowing into the compressor impeller decreases, a phenomenon called surging occurs.

Patent Literature 1 discloses a centrifugal compressor in which a circulation flow path is formed in a compressor housing. The circulation flow path returns a portion of air flowing through a compressor impeller to a position upstream of the compressor impeller. This increases a flow rate of air flowing upstream of the compressor impeller when the flow rate is small, thereby inhibiting an occurrence of surging.

CITATION LIST

Patent Literature

Patent Literature 1: JP H6-185498 A

SUMMARY

Technical Problem

Thus, according to Patent Literature 1, an operational range of the centrifugal compressor can be expanded to a smaller flow rate area by inhibiting the occurrence of surging. However, the air returned to the position upstream of the compressor impeller by the circulation flow path is mixed with the air flowing the intake flow path, resulting in a mixing loss. Therefore, Patent Literature 1 includes a problem that a compressing efficiency of the centrifugal compressor is reduced.

An object of the present disclosure is to provide a centrifugal compressor capable of inhibiting a compressing efficiency loss.

Solution to Problem

In order to solve the above problem, a centrifugal compressor according to one aspect of the present disclosure includes a housing including an intake flow path; a compressor impeller disposed in the intake flow path; a circulation flow path provided outside the intake flow path in a radial direction of the compressor impeller, and connected to the intake flow path at a downstream position that radially faces the compressor impeller and at an upstream position that is upstream of the downstream position with respect to the compressor impeller; and a movable member disposed at the upstream position and including a body portion having a protruding portion, the movable member being movable between a protruding position where the circulation flow path is closed by the body portion and the protruding portion is located in the intake flow path, and a retracted position where the protruding portion is retracted from the intake flow path and the circulation flow path is connected to the intake flow path.

The body portion may include a curved portion extending in a circumferential direction of the compressor impeller, and a depression may be formed on an inner peripheral surface of the curved portion.

The centrifugal compressor may further include a drive controller for moving the movable member to the retracted position or the protruding position based on a compressor efficiency.

Effects of Disclosure

According to the present disclosure, a compressing efficiency loss of a centrifugal compressor can be inhibited.

DESCRIPTION OF EMBODIMENTS

Embodiments of the present disclosure will be described in detail below with reference to the accompanying drawings. Specific dimensions, materials, and numerical values, etc. shown in the embodiments are merely examples for a better understanding, and do not limit the present disclosure unless otherwise specified. In this specification and the drawings, duplicate explanations are omitted for elements having substantially the same functions and configurations by affixing the same reference sign. In addition, elements not directly related to the present disclosure are omitted from the figures.

Figure 1:
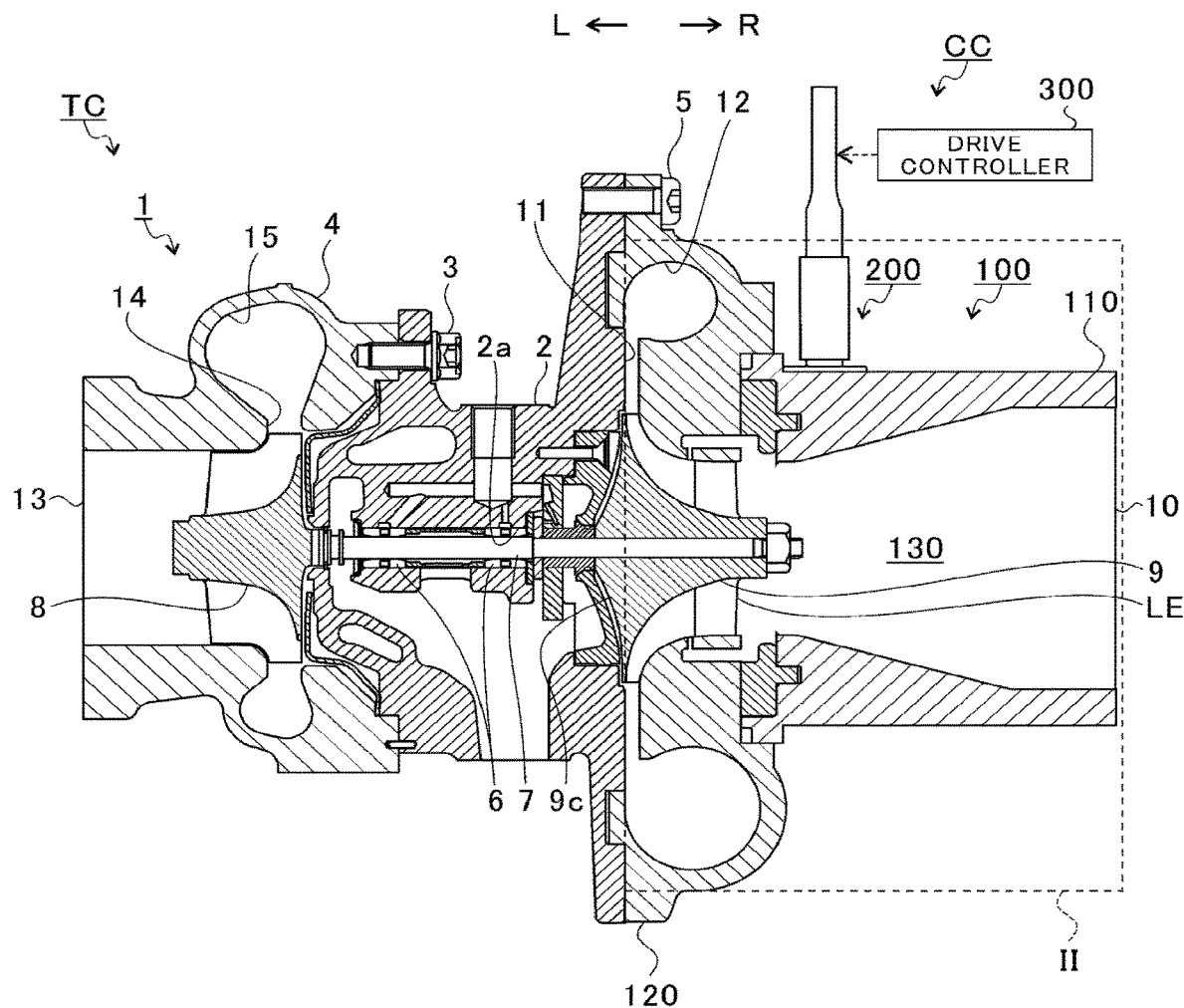
FIG. 1 is a schematic cross-sectional view of a turbocharger.

FIG. 1 is a schematic cross-sectional view of a turbocharger TC. A direction indicated by an arrow L shown in FIG. 1 is described as the left side of the turbocharger TC. A direction indicated by an arrow R shown in FIG. 1 is described as the right side of the turbocharger TC. In the turbocharger TC, a part including a compressor housing 100 (described below) functions as a centrifugal compressor CC. Hereinafter, the centrifugal compressor CC will be described as being driven by a turbine impeller 8 which will also be described below. However, the centrifugal compressor CC is not limited thereto, and may be driven by an engine (not shown) or by an electric motor (motor) (not shown). Thus, the centrifugal compressor CC may be incorporated into a device other than the turbocharger TC, or may be a stand-alone device.

As shown in FIG. 1, the turbocharger TC comprises a turbocharger body 1. The turbocharger body 1 includes a bearing housing 2, a turbine housing 4, a compressor housing (housing) 100, a link mechanism 200, and a drive controller 300. Details of the link mechanism 200 and the drive controller 300 will be described later. The turbine housing 4 is connected to the left side of the bearing housing 2 by a fastening bolt 3. The compressor housing 100 is connected to the right side of the bearing housing 2 by a fastening bolt 5.

An accommodation hole 2a is formed in the bearing housing 2. The accommodation hole 2a passes through in the left-to-right direction of the turbocharger TC. A bearing 6 is arranged in the accommodation hole 2a. In FIG. 1, a full-floating bearing is shown as an example of the bearing 6. However, the bearing 6 may be any other radial bearing, such as a semi-floating bearing or a rolling bearing. A portion of a shaft 7 is arranged in the accommodation hole 2a. The shaft 7 is rotatably supported by the bearing 6. A turbine impeller 8 is provided at the left end of the shaft 7. The turbine impeller 8 is rotatably housed in the turbine housing 4. A compressor impeller 9 is provided at the right end of the shaft 7. The compressor impeller 9 is rotatably housed in the compressor housing 100.

An inlet 10 is formed in the compressor housing 100. The inlet 10 opens to the right side of the turbocharger TC. The inlet 10 is connected to an air cleaner (not shown). A diffuser flow path 11 is formed between the bearing housing 2 and the compressor housing 100. The diffuser flow path 11 pressurizes air. The diffuser flow path 11 has an annular shape from an inner side to an outer side in a radial direction of the shaft 7 (compressor impeller 9) (hereinafter simply referred to as the radial direction). The diffuser flow path 11 is connected to the inlet 10 via the compressor impeller 9 at the inner side in the radial direction.

A compressor scroll flow path 12 is formed in the compressor housing 100. The compressor scroll flow path 12 has an annular shape. The compressor scroll flow path 12 is, for example, positioned radially outside the compressor impeller 9. The compressor scroll flow path 12 is connected to an air intake of the engine (not shown) and to the diffuser flow path 11. When the compressor impeller 9 rotates, air is sucked into the compressor housing 100 from the inlet 10. The intake air is pressurized and accelerated when passing through the blades of the compressor impeller 9. The pressurized and accelerated air is further pressurized in the diffuser flow path 11 and the compressor scroll flow path 12. The pressurized air is discharged from a discharge port (not shown) and is led to the air intake port of the engine.

As described above, the turbocharger TC comprises the centrifugal compressor (compressor) CC. The centrifugal compressor CC includes the compressor housing 100, the compressor impeller 9, the compressor scroll flow path 12, and the link mechanism 200 and the drive controller 300 which will be described below.

An outlet 13 is formed in the turbine housing 4. The outlet 13 opens to the left side of the turbocharger TC. The outlet 13 is connected to an exhaust gas purification device (not shown). A connecting flow path 14 and a turbine scroll flow path 15 are formed in the turbine housing 4. The turbine scroll flow path 15 is positioned radially outside the turbine impeller 8. The connecting flow path 14 is positioned between the turbine impeller 8 and the turbine scroll flow path 15.

The turbine scroll flow path 15 is connected to a gas intake (not shown). Exhaust gas discharged from an exhaust manifold (not shown) of the engine is led to the gas intake. The connecting flow path 14 connects the turbine scroll flow path 15 with the outlet 13 through the turbine impeller 8. The exhaust gas led from the gas intake to the turbine scroll flow path 15 is led to the outlet 13 through the connecting flow path 14 and between the blades of the turbine impeller 8. The exhaust gas rotates the turbine impeller 8 when passing therethrough.

The rotational force of the turbine impeller 8 is transmitted to the compressor impeller 9 via the shaft 7. As described above, the air is pressurized by the rotational force of the compressor impeller 9 and is led to the air intake of the engine.

Figure 2:
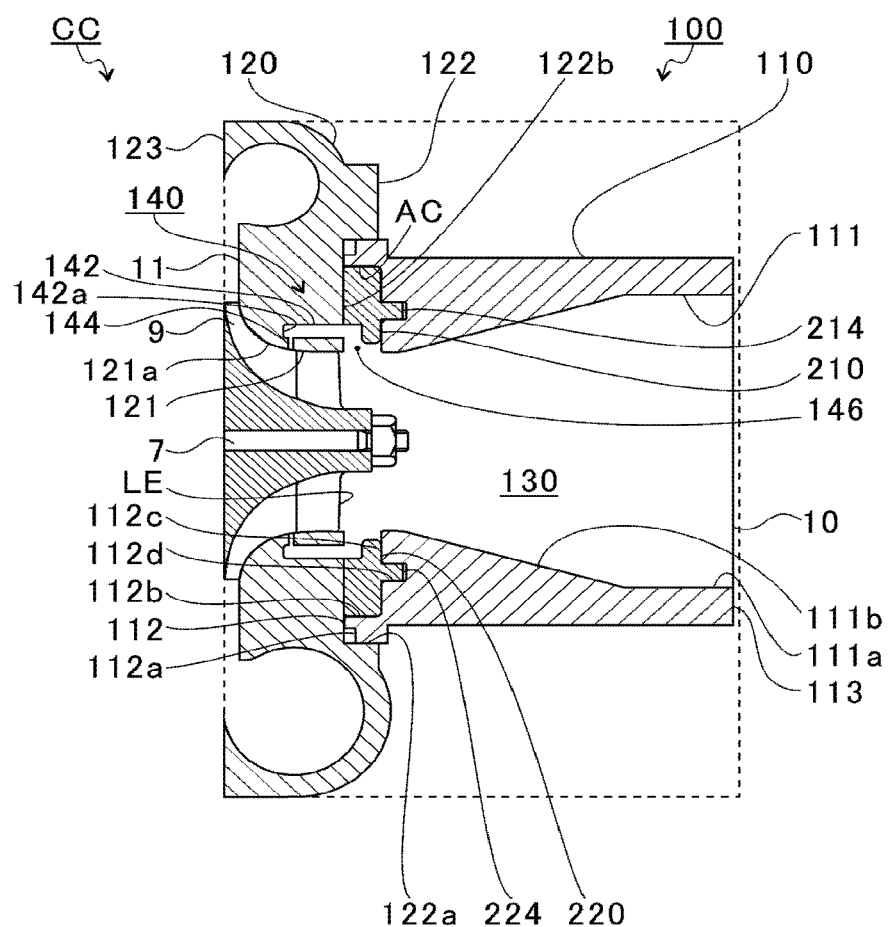
FIG. 2 is an extraction of a dashed area in FIG. 1.

FIG. 2 is an extraction of a dashed area in FIG. 1. As shown in FIG. 2, the compressor housing 100 includes a first housing member 110 and a second housing member 120. The first housing member 110 is positioned in the right side of the second housing member 120 in FIG. 2 (a side spaced apart from the bearing housing 2). The second housing member 120 is connected to the bearing housing 2. The first housing member 110 is connected to the second housing member 120.

The first housing member 110 has an approximately cylindrical shape. A through hole 111 is formed in the first housing member 110. The first housing member 110 includes an end surface 112 on a side that is proximate (connected) to the second housing member 120. The first housing member 110 includes an end surface 113 on a side that is spaced apart from the second housing member 120. The inlet 10 is formed on the end surface 113. The through hole 111 extends from the end surface 112 to the end surface 113 along a rotational axis direction of the shaft 7 (compressor impeller 9) (hereinafter simply referred to as the rotational axis direction). In other words, the through hole 111 penetrates the first housing member 110 in the rotational axis direction. The through hole 111 includes the inlet 10 at the end surface 113.

The through hole 111 includes a parallel portion 111a and a tapered portion 111b. The parallel portion 111a is positioned closer to the end surface 113 with respect to the tapered portion 111b. An inner diameter of the parallel portion 111a is substantially constant over the rotational axis direction. The tapered portion 111b is positioned closer to the end surface 112 with respect to the parallel portion 111a. The tapered portion 111b is continuous with the parallel portion 111a. In the tapered portion 111b, an inner diameter of a portion that is continuous with the parallel portion 111a is substantially equal to the inner diameter of the parallel portion 111a. The inner diameter of the tapered portion 111b decreases as being spaced apart from the parallel portion 111a (as approaching the end surface 112).

A notch portion 112a is formed on the end surface 112. The notch portion 112a is depressed from the end surface 112 toward the end surface 113. The notch 112a is formed on an outer periphery of the end surface 112. The notch portion 112a has, for example, a substantially annular shape when seen from the rotational axis direction.

An accommodation chamber AC is formed on the end surface 112. The accommodation chamber AC is formed closer to the inlet 10 of an intake flow path 130 in the first housing member 110 with respect to leading edges LE of the blades of the compressor impeller 9. The accommodation chamber AC includes an accommodation groove 112b, bearing holes 112d, and an accommodation hole 115 which will be described later.

The accommodation groove 112b is formed in the end surface 112. The accommodating groove 112b is positioned between the notch portion 112a and the through hole 111.

The accommodation groove 112b is depressed from the end surface 112 toward the end surface 113. The accommodating groove 112b has, for example, a substantially annular shape when seen from the rotational axis direction. The accommodating groove 112b is connected to the through hole 111 at a radially inner side.

The bearing holes 112d are formed in a wall surface 112c on the end surface 113 side of the accommodation groove 112b. The bearing holes 112d extend in the rotational axis direction from the wall surface 112c toward the end surface 113. Two bearing holes 112d are provided with being spaced apart from each other in a rotational direction of the shaft 7 (compressor impeller 9) (hereinafter simply referred to as the rotational direction or a circumferential direction). The two bearing holes 112d are arranged at positions spaced apart from each other by 180 degrees in the rotational direction.

A through hole 121 is formed in the second housing member 120. The second housing member 120 includes an end surface 122 on a side proximate (connected) to the first housing member 110. The second housing member 120 has an end surface 123 on a side spaced apart from the first housing member 110 (a side connected to the bearing housing 2). The through hole 121 extends from the end surface 122 to the end surface 123 along the rotational axis direction. In other words, the through hole 121 penetrates the second housing member 120 in the rotational axis direction.

An inner diameter of the through hole 121 at an end portion on the end surface 122 is substantially equal to the inner diameter of the through hole 111 at an end portion on the end surface 112. A shroud portion 121a is formed on an inner wall of the through hole 121. The shroud portion 121a faces the compressor impeller 9 from radially outside. An outer diameter of the compressor impeller 9 increases as being spaced apart from the leading edges LE of the blades of the compressor impeller 9. An inner diameter of the shroud portion 121a increases as being spaced apart from the end surface 122 (as approaching the end surface 123).

An accommodation groove 122a is formed on the end surface 122. The accommodation groove 122a is depressed from the end surface 122 toward the end surface 123. The accommodation groove 122a has, for example, a substantially annular shape when seen from the rotational axis direction. The housing member 110 is inserted into the accommodation groove 122a. The end surface 112 of the first housing member 110 contacts a wall surface 122b formed on the end surface 123 side of the accommodation groove 122a. In this state, the accommodation chamber AC is formed between the first housing member 110 (wall surface 112c) and the second housing member 120 (wall surface 122b).

The through hole 111 of the first housing member 110 and the through hole 121 of the second housing member 120 form an intake flow path 130. In this manner, the intake flow path 130 is formed in the compressor housing 100. The intake flow path 130 is connected from an air cleaner (not shown) to the diffuser flow path 11 through the inlet 10. In the present disclosure, an air cleaner side of the intake flow path 130 is referred to as an upstream side of the intake air (hereinafter may simply be referred to as the upstream side), and the diffuser flow path 11 side of the intake flow path 130 is referred to as a downstream side of the intake air (hereinafter may simply be referred to as the downstream side).

The compressor impeller 9 is arranged in the intake flow path 130. A cross-sectional shape of the intake flow path 130 (through holes 111 and 121) perpendicular to the rotational axis direction has, for example, a circular shape centered on the rotational axis of the compressor impeller 9. However, the cross-sectional shape of the intake flow path 130 is not limited thereto, and may be, for example, an elliptical shape.

A sealing member (not shown) is disposed in the notch portion 112a of the first housing member 110. The sealing member reduces an air flow through a gap between the first housing member 110 and the second housing member 120. However, the notch portion 112a and the sealing member are not essential.

In the present embodiment, a circulation flow path 140 is formed in the compressor housing 100. The circulation flow path 140 is arranged radially outside the intake flow path 130. The circulation flow path 140 includes a communication hole 142, a downstream slit 144, and an upstream slit 146 (accommodation chamber AC).

The communication hole 142 is formed on the wall surface 122b of the second housing member 120. The communication hole 142 is a non-through hole that is depressed from the wall surface 122b (end face 122) toward the end face 123. The communication hole 142 includes a bottom surface 142a. The communication hole 142 is formed between the wall surface 112c and the bottom surface 142a when the first housing member 110 is connected to the second housing member 120. In other words, the communication hole 142 constitutes a part of the housing chamber AC. The communication hole 142 extends in the rotational axis direction. However, the communication hole 142 may extend in a direction inclined from the rotational axis direction. The communication hole 142 is arranged radially outside the through hole 121. The communication hole 142 has, for example, a substantially annular shape when seen from the rotational axis direction.

Ribs (not shown) are formed in the second housing member 120. The ribs are arranged in the communication hole 142. The ribs connect an outer wall portion (a radially outer portion) and an inner wall portion (a radially inner portion) of the second housing member 120 that are separated by the communication hole 142. A plurality of ribs are arranged spaced apart from each other in the circumferential direction. The inner wall portion of the second housing member 120 is supported by the outer wall portion via the ribs. The ribs are integrally formed with the outer wall portion and the inner wall portion of the second housing member 120. However, the inner wall portion may be formed separately from the outer wall portion (second housing member 120).

The downstream slit 144 is formed in the shroud portion 121a of the second housing member 120. The downstream slit 144 connects the communication hole 142 with the through hole 121. The downstream slit 144 extends in the radial direction. The downstream slit 144 has, for example, a substantially annular shape when seen from the rotational axis direction. The downstream slit 144 is arranged at a position facing the blades of the compressor impeller 9 in the radial direction (hereinafter referred to as a downstream position).

The upstream slit 146 is formed between the wall surface 122b of the second housing member 120 and the wall surface 112c of the first housing member 110. In other words, the upstream slit 146 constitutes a part of the accommodation chamber AC. The upstream slit 146 connects the communication hole 142 with the through hole 111. The upstream slit 146 extends in the radial direction. The upstream slit 146 has, for example, a substantially annular shape when seen from the rotational axis direction. The upstream slit 146 is arranged upstream of the leading edge LE of the blades of the compressor impeller 9 in a flow of the intake air (hereinafter referred to as the upstream position).

The circulation flow path 140 is formed by the communication hole 142, the downstream slit 144, and the upstream slit 146 (accommodation chamber AC). The circulation flow path 140 is connected to the intake flow path 130 at a position downstream of the leading edge LE of the blades of the compressor impeller 9 in the flow of the intake air through the downstream slit 144. The circulation flow path 140 is connected to the intake flow path 130 at a position upstream of the leading edge LE of the blades of the compressor impeller 9 in the flow of the intake air through the upstream slit 146.

In this manner, the circulation flow path 140 is connected to the intake flow path 130 at the downstream position that radially faces the compressor impeller 9, and at the upstream position that is upstream of the compressor impeller 9 with respect to the downstream position.

Figure 3:
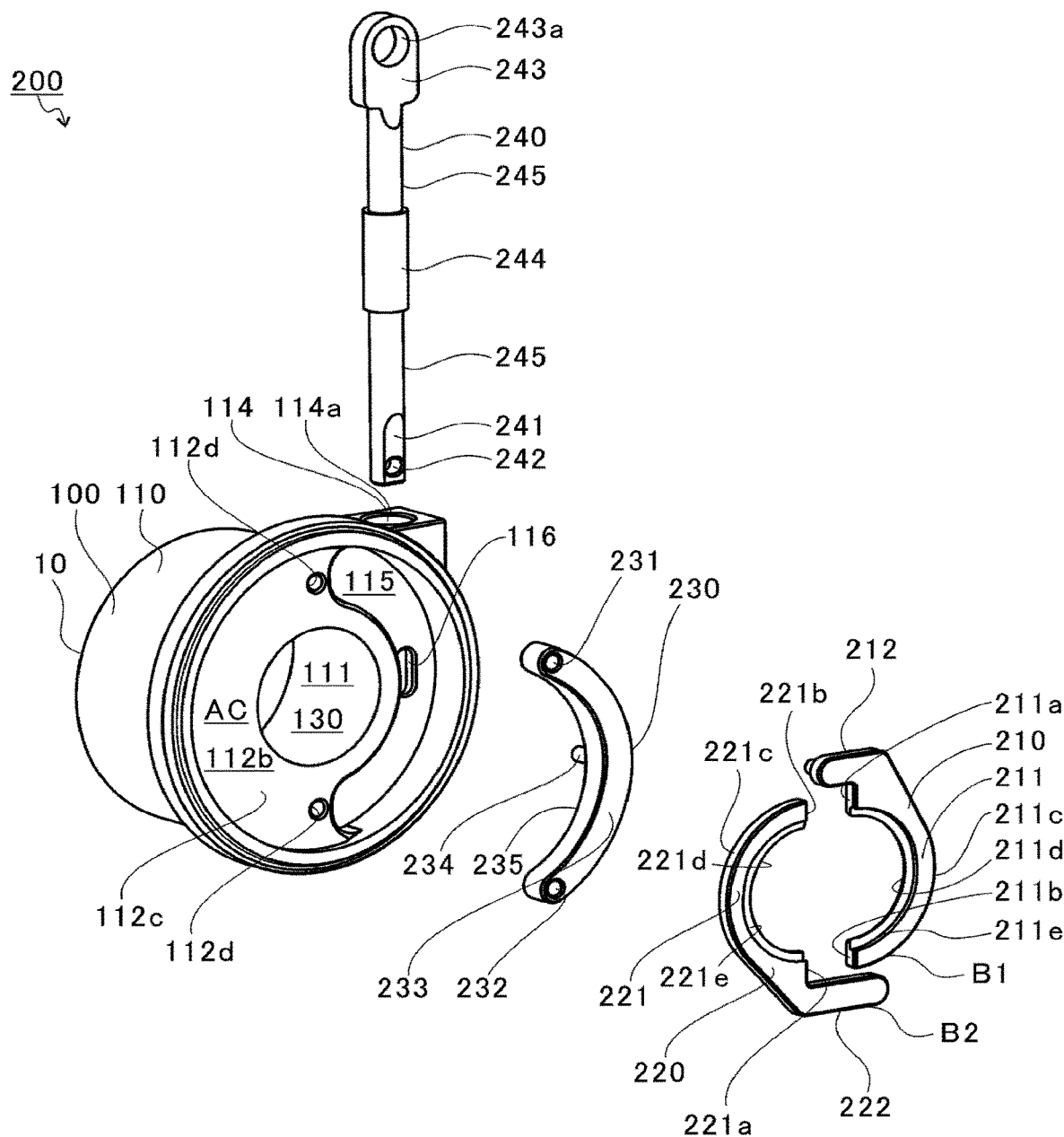
FIG. 3 is an exploded view of components of a link mechanism.

FIG. 3 is an exploded view of components of the link mechanism 200. In FIG. 3, only the first housing member 110 of the compressor housing 100 is shown. As shown in FIG. 3, the link mechanism 200 includes the first housing member 110, a first movable member 210, a second movable member 220, a connecting member 230, and a rod 240. In the intake flow path 130, the link mechanism 200 is arranged closer to the inlet 10 (the upstream side) with respect to the compressor impeller 9 in the rotational axis direction.

The first movable member 210 is disposed in the accommodation groove 112b (accommodation chamber AC). Specifically, the first movable member 210 is disposed between the wall surface 112c of the accommodation groove 112b and the wall surface 122b of the accommodation groove 122a (see FIG. 2) in the rotational axis direction. The first movable member 210 includes a body portion B1. The body portion B1 includes a curved portion 211 and an arm portion 212.

The curved portion 211 extends in a circumferential direction of the compressor impeller 9. The curved portion 211 has a substantially semicircular arc shape. One end surface 211a and the other end surface 211b of the curved portion 211 in the circumferential direction extend parallel to the radial direction and the rotational axis direction. However, the one end surface 211a and the other end surface 211b may be inclined with respect to the radial direction and the rotational axis direction.

The arm portion 212 is provided on a side of the one end surface 211a of the curved portion 211. The arm portion 212 extends radially outward from an outer peripheral surface 211c of the curved portion 211. The arm portion 212 extends in a direction that is inclined with respect to the radial direction (toward the second movable member 220).

The curved portion 211 includes a depression 211e formed on an inner peripheral surface 211d. The depression 211e is depressed from the inner peripheral surface 211d of the curved portion 211 toward the outer peripheral surface 211c. In the curved portion 211, the depression 211e is formed on a side proximate to the second housing member 120 in the rotational axis direction.

The depression 211e is opened on a surface of the curved portion 211 on a side spaced apart from the first housing member 110 (opened on an opposing surface that faces the second housing member 120). The depression 211e is depressed from the surface of the curved portion 211 on the side spaced apart from the first housing member 110, toward an opposing surface that faces the first housing member 110.

The second movable member 220 is disposed in the accommodation groove 112b (accommodation chamber AC). Specifically, the second movable member 220 is disposed between the wall surface 112c of the accommodation groove 112b and the wall surface 122b of the accommodation groove 122a (see FIG. 2) in the rotational axis direction. The second movable member 220 includes a body portion B2. The body portion B2 includes a curved portion 221 and an arm portion 222.

The curved portion 221 extends in a circumferential direction of the compressor impeller 9. The curved portion 221 has a substantially semicircular arc shape. One end surface 221a and the other end surface 221b of the curved portion 221 in the circumferential direction extend parallel to the radial direction and the rotational axis direction. However, the one end surface 221a and the other end surface 221b may be inclined with respect to the radial direction and the rotational axis direction.

The arm portion 222 is provided on a side of the one end surface 221a of the curved portion 221. The arm portion 222 extends radially outward from ah outer peripheral surface 221c of the curved portion 221. The arm portion 222 extends in a direction that is inclined with respect to the radial direction (toward the first movable member 210 side).

The curved portion 221 includes a depression 221e formed on an inner peripheral surface 221d. The depression 221e is depressed from the inner peripheral surface 221d of the curved portion 221 toward the outer peripheral surface 221c. In the curved portion 221, the depression 221e is formed on a side proximate to the second housing member 120 in the rotational axis direction.

The depression 221e is opened on a surface of the curved portion 221 on a side spaced apart from the first housing member 110 (opened on an opposing surface that faces the second housing member 120). The depression 221e is depressed from the surface of the curved portion 221 on the side spaced apart from the first housing member 110, toward an opposing surface that faces the first housing member 110.

The curved portion 211 faces the curved portion 221 across the center of rotation of the compressor impeller 9 (intake flow path 130). The one end surface 211a of the curved portion 211 faces the other end surface 221b of the curved portion 221 in the circumferential direction. The other end surface 211b of the curved portion 211 faces the one end surface 221a of the curved portion 221 in the circumferential direction. The first movable member 210 and the second movable member 220 are configured so that the curved portions 211 and 221 are movable in the radial direction, as will be described in detail below.

The connecting member 230 is connected to the first movable member 210 and the second movable member 220. The connecting member 230 is positioned closer to the inlet 10 with respect to the first movable member 210 and the second movable member 220. The connecting member 230 has a substantially circular arc shape. The connecting member 230 has a first bearing hole 231 formed at one end in the circumferential direction and a second bearing hole 232 formed at the other end. In the connecting member 230, the first bearing hole 231 and the second bearing hole 232 are opened on an end surface 233 closer to the first movable member 210 and the second movable member 220. The first bearing hole 231 and the second bearing hole 232 extend in the rotational axis direction. In this embodiment, the first bearing hole 231 and the second bearing hole 232 are non-through holes. However, the first bearing hole 231 and the second bearing hole 232 may penetrate the connecting member 230 in the rotational axis direction.

In the connecting member 230, a rod connection portion 234 is formed between the first bearing hole 231 and the second bearing hole 232. In the connecting member 230, the rod connection portion 234 is formed on an end surface 235 opposite to the first movable member 210 and the second movable member 220. The rod connection portion 234 protrudes in the rotational axis direction from the end surface 235. The rod connection portion 234 has, for example, a substantially cylindrical shape.

The rod 240 has a substantially cylindrical shape. The rod 240 has a flat portion 241 formed at one end and a connecting portion 243 formed at the other end. The flat portion 241 extends in a plane direction substantially perpendicular to the rotational axis direction. A bearing hole 242 is opened in the flat portion 241. The bearing hole 242 extends in the rotational axis direction. The connecting portion 243 has a connecting hole 243a. An actuator (described below) is connected to the connecting portion 243 (the connecting hole 243a). The bearing hole 242 may be, for example, an elongated hole whose length in a direction perpendicular to the rotational axis direction and an axial direction of the rod 240 (left-to-right direction in FIG. 6 which will be described below) is longer than a length in the axial length of the rod 240.

The rod 240 includes a rod large diameter portion 244 and two rod small diameter portions 245 between the flat portion 241 and the connecting portion 243. The rod large diameter portion 244 is disposed between the two rod small diameters 245. Between the two rod small diameter portions 245, the rod small diameter portion 245 closer to the flat portion 241 connects the rod large diameter portion 244 with the flat portion 241. Between the two rod small diameter portions 245, the rod small diameter portion 245 closer to the connecting portion 243 connects the rod large diameter 24 4 with the connecting portion 243. An outer diameter of the rod large diameter portion 244 is larger than an outer diameter of the two rod small diameter portions 245.

An insertion hole 114 is formed in the first housing member 110. One end 114a of the insertion hole 114 opens to an outside of the first housing member 110. The insertion hole 114 extends, for example, in a plane direction perpendicular to the rotational axis direction. The insertion hole 114 is positioned radially outside the through hole 111 (intake flow path 130). A side including the flat portion 241 of the rod 240 is inserted into the insertion hole 114. The rod large diameter portion 244 is guided by an inner wall surface of the insertion hole 114. The rod 240 is restricted from moving in directions other than a central axis direction of the insertion hole 114 (the central axis direction of the rod 240).

An accommodation hole 115 is formed in the first housing member 110. The accommodation hole 115 is opened on the wall surface 112c of the accommodation groove 112b. The accommodation hole 115 is recessed from the wall surface 112c toward the inlet 10. The accommodation hole 115 is positioned spaced apart from the inlet 110 (closer to the second housing member 120) with respect to the insertion hole 114. The accommodation hole 115 has a substantially arc shape when seen from the rotational axis direction. The accommodation hole 115 extends longer than the connecting member 230 in the circumferential direction. The accommodation hole 115 is circumferentially spaced apart from the bearing hole 112d.

A connecting hole 116 is formed in the first housing member 110. The connecting hole 116 connects the insertion hole 114 with the accommodation hole 115. The connecting hole 116 is formed at a substantially middle portion in the circumferential direction in the accommodation hole 115.

The connecting hole 116 is, for example, an elongated hole extending substantially parallel to the extending direction of the insertion hole 114. The connecting hole 116 has a width in the longitudinal direction (extending direction) that is greater than a width in the lateral direction (perpendicular to the extending direction). The width in the lateral direction of the connecting hole 114 is greater than the outer diameter of the rod connection portion 234 of the connecting member 230.

The connecting member 230 is accommodated in the accommodation hole 115 (accommodation chamber AC). In this manner, the first movable member 210, the second movable member 220, and the connecting member 230 are disposed in the accommodation chamber AC formed in the first housing member 110. The accommodation hole 115 has a longer circumferential length and a larger radial width than those of the connecting member 230. Therefore, the connecting member 230 is allowed to move inside the accommodation hole 115 in a plane direction perpendicular to the rotational axis direction.

The rod connection portion 234 is inserted from the connecting hole 116 into the insertion hole 114. The flat portion 241 of the rod 240 is inserted into the insertion hole 114. The bearing hole 242 of the flat portion 241 faces the connecting hole 116. The rod connection portion 234 is inserted into (connected to) the bearing hole 242. The rod connection portion 234 is supported by the bearing hole 242.

Figure 4:
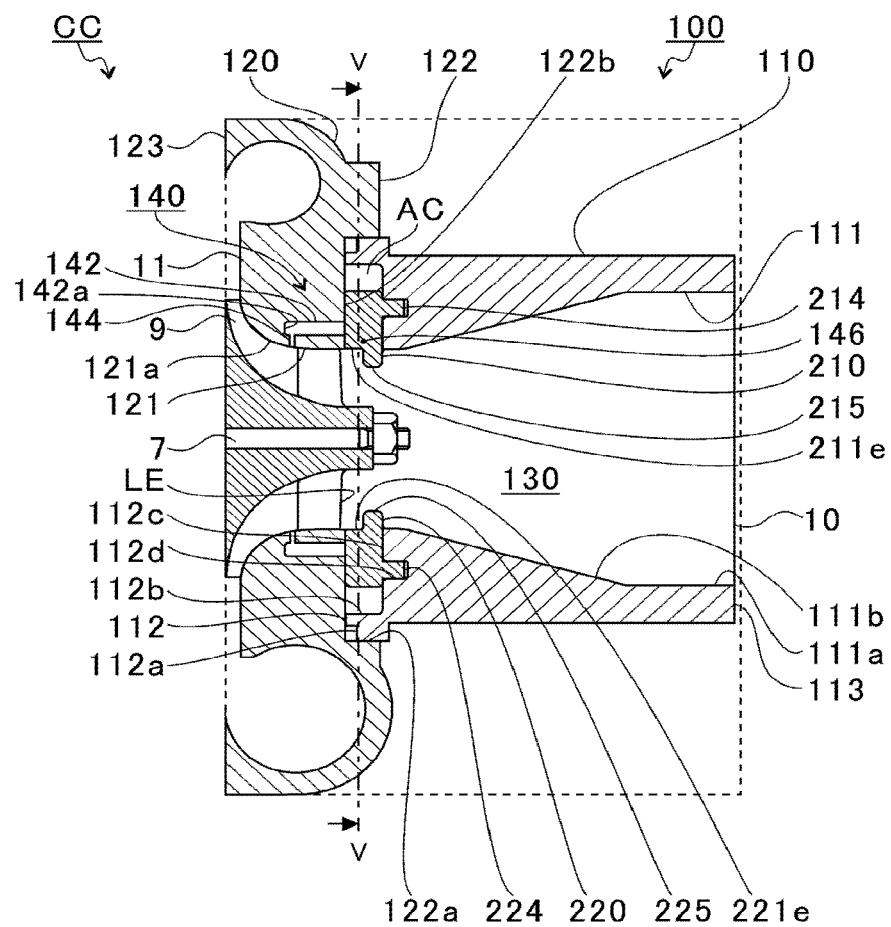
FIG. 4 shows a state in which a first movable member and a second movable member shown in FIG. 2 are moved radially inward.

FIG. 4 shows a state in which the first movable member 210 and the second movable member 220 shown in FIG. 2 are moved radially inward. In FIG. 2, the first movable member 210 and the second movable member 220 are housed in the housing chamber AC and are not exposed (protruding) into the intake flow path 130. In contrast, in FIG. 4, the first movable member 210 and the second movable member 220 are partly exposed (protruding) into the intake flow path 130, and the other part is housed in the accommodation chamber AC. In this state, the bottom surfaces of the depressions 211e and 221e are substantially flush with the inner peripheral surfaces of the through holes 111, 121.

Figure 5:
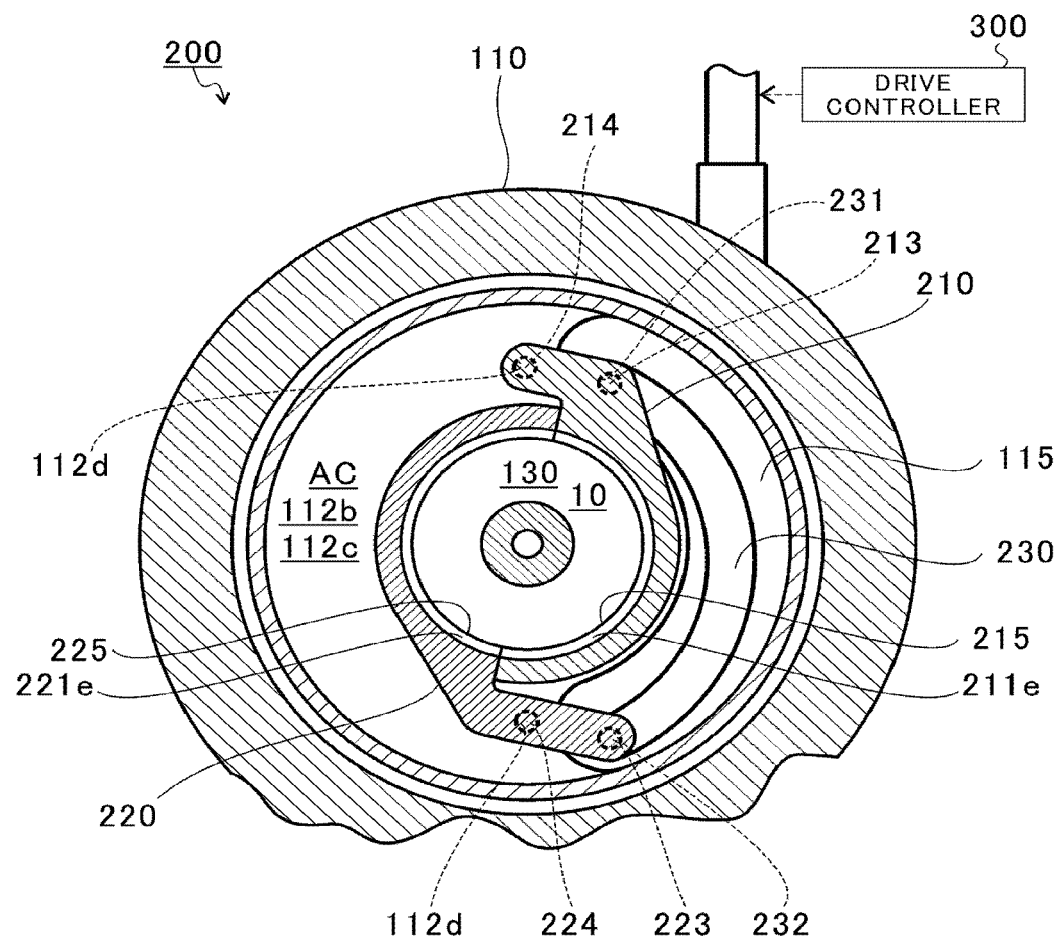
FIG. 5 is a cross-sectional view taken along V-V line in FIG. 4.

FIG. 5 is a cross-sectional view taken along line V-V in FIG. 4. As shown by dashed lines in FIG. 5, the first movable member 210 has a connecting shaft portion 213 and a rotational shaft portion 214. In the first movable member 210, the connecting shaft portion 213 and the rotational shaft portion 214 protrude in the rotational axis direction from an end surface closer to the inlet 10 (the wall surface 112c side of the accommodation groove 112b). The connecting shaft portion 213 and the rotational shaft portion 214 extend to the back side of the paper in FIG. 5. The rotational shaft portion 214 extends parallel to the connecting shaft portion 213. The connecting shaft portion 213 and the rotational shaft portion 214 have a substantially cylindrical shape.

The outer diameter of the connecting shaft portion 213 is smaller than the inner diameter of the first bearing hole 231 of the connecting member 230. The connecting shaft portion 213 is inserted into the first bearing hole 231. The connecting shaft portion 213 is rotatably supported by the first bearing hole 231. The outer diameter of the rotational shaft portion 214 is smaller than the inner diameter of the bearing hole 112d of the first housing member 110. Between the two bearing holes 112d, the rotational shaft portion 214 is inserted into the bearing hole 112d on the vertically upper side (proximate to the rod 240). The rotational shaft portion 214 is rotatably supported by the bearing hole 112d. The rotational shaft portion 214 connects the first movable member 210 with the wall surface 112c facing the first movable member 210 in the rotational axis direction.

The second movable member 220 includes a connecting shaft portion 223 and a rotational shaft portion 224. In the second movable member 220, the connecting shaft portion 223 and the rotational shaft portion 224 protrude in the rotational axis direction from an end surface closer to the inlet 10 (the wall surface 112c side of the accommodation groove 112b). The connecting shaft portion 223 and the rotational shaft portion 224 extend to the back side of the paper in FIG. 5. The rotational shaft portion 224 extends parallel to the connecting shaft portion 223. The connecting shaft portion 223 and the rotational shaft portion 224 have a substantially cylindrical shape.

The outer diameter of the connecting shaft portion 223 is smaller than the inner diameter of the second bearing hole 232 of the connecting member 230. The connecting shaft portion 223 is inserted into the second bearing hole 232. The connecting shaft portion 223 is rotatably supported by the second bearing hole 232. The outer diameter of the rotational shaft portion 224 is smaller than the inner diameter of the bearing hole 112d of the first housing member 110. Between the two bearing holes 112d, the rotational shaft portion 224 is inserted into the bearing hole 112d on the vertically lower side (spaced apart from the rod 240). The rotational shaft portion 224 is rotatably supported by the bearing hole 112d. The rotational shaft portion 224 connects the second movable member 220 with the wall surface 112c facing the second movable member 220 in the rotational axis direction.

Accordingly, the link mechanism 200 includes a four-bar linkage. The four links (nodes) are the first movable member 210, the second movable member 220, the first housing member 110, and the connecting member 230. Since the link mechanism 200 includes a four-bar linkage, it is a limited chain and has one degree of freedom, making it easy to control.

The drive controller 300 comprises a microcomputer including a central processing unit (CPU), a ROM in which a program or the like is stored, a RAM as a work area, and the like. The drive controller 300 controls an operation of the link mechanism 200. The drive controller 300 receives signals output from sensors (not shown) that detect the state of the centrifugal compressor CC (e.g., rotational speed of the shaft 7, and flow rate and pressure ratio of the centrifugal compressor CC) and the state of the engine (not shown) (e.g., rotational speed and load of the engine). The drive controller 300 controls the operation of the link mechanism 200 based on the signals output from the respective sensors.

Figure 6:
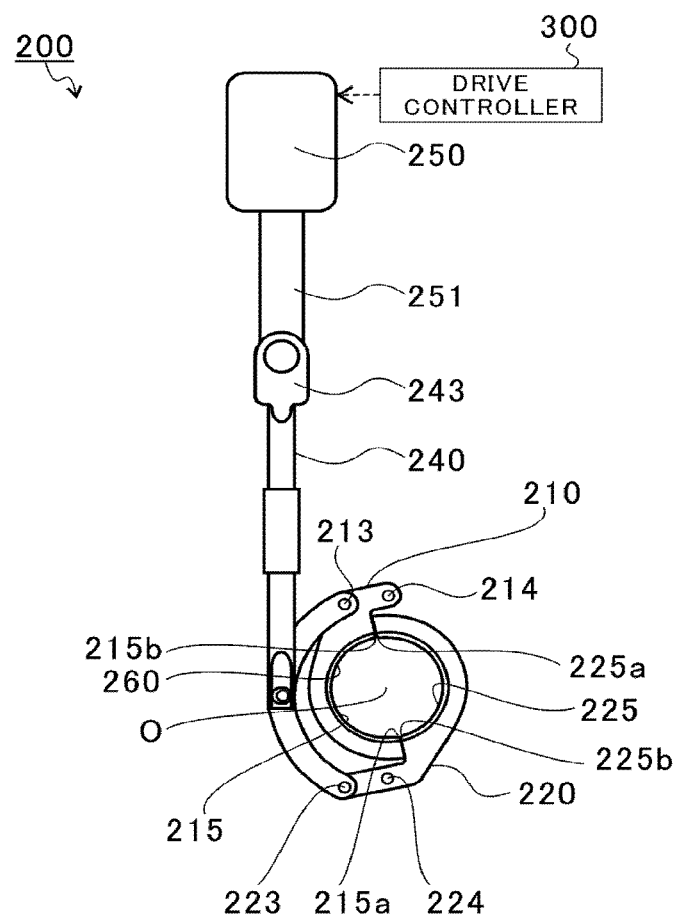
FIG. 6 is a first illustration of an operation of the link mechanism (throttling mechanism).

FIG. 6 is a first illustration of an operation of the link mechanism 200. In the following FIGS. 6, 7 and 8, the link mechanism 200 is seen from the inlet 10. As shown in FIG. 6, one end of the drive shaft 251 of the actuator 250 is connected to the connecting portion 243 of the rod 240.

In the arrangement shown in FIG. 6, the first movable member 210 and the second movable member 220 are in contact with each other. In this state, as shown in FIGS. 4 and 5, a protruding portion 215 that is an inner portion in the radial direction of the first movable member 210 protrudes (is exposed) into the intake flow path 130. A protruding portion 225 that is an inner portion in the radial direction of the second movable member 220 protrudes (is exposed) into the intake flow path 130. The positions of the first movable member 210 and the second movable member 220 in this state are referred to as a protruding position (or a throttle position).

As shown in FIG. 6, in the protruding position, the circumferential ends 215a and 215b of the protruding portion 215 and the circumferential ends 225a and 225b of the protruding portion 225 are in contact with each other. An annular hole 260 is formed by the protruding portion 215 and the protruding portion 225. An inner diameter of the annular hole 260 is smaller than an inner diameter of the intake flow path 130 at a position where the protruding portions 215 and 225 protrude. The inner diameter of the annular hole 260 is, for example, smaller than the inner diameter of the intake flow path 130 at any portions.

As shown in FIG. 4, the first movable member 210 and the second movable member 220 are arranged in the upstream slit 146 (upstream position). In the protruding position, at least a portion (in this embodiment, the protruding portions 215 and 225) of the inner peripheral surfaces 211d and 221d (see FIG. 3) of the first movable member 210 and the second movable member 220 are disposed in the intake flow path 130.

When the first movable member 210 and the second movable member 220 are positioned in the protruding position, the upstream slit 146 is blocked by the first movable member 210 and the second movable member 220. In other words, the upstream slit 146 does not connect the communication hole 142 with the through holes 111 and 121, and the circulation flow path 140 is blocked.

In this manner, in the protruding position, the circulation flow path 140 is closed by the first movable member 210 and the second movable member 220 (body portions B1 and B2), and the protruding portions 215 and 225 are located in the intake flow path 130.

The intake flow path 130 has a smaller flow path cross-sectional area since at least a part of the inner peripheral surfaces 211d and 221d of the first movable member 210 and the second movable member 220 (in this embodiment, the protruding portions 215 and 225) protrude (are exposed) into the intake flow path 130.

As the flow rate of the air flowing into the compressor impeller 9 decreases, the air compressed by the compressor impeller 9 may flow backward through the intake flow path 130 (i.e., the air flows from the downstream side to the upstream side).

As shown in FIG. 4, when the first movable member 210 and the second movable member 220 are positioned in the protruding position (hereinafter also referred to as a protruding position state), the protruding portions 215 and 225 are located radially inside the outermost end of the leading edge LE of the compressor impeller 9. As a result, air flowing backward in the intake flow path 130 is blocked by the protruding portions 215 and 225. Accordingly, the first movable member 210 and the second movable member 220 can inhibit the backflow of air in the intake flow passage 130.

Since the flow path cross-sectional area of the intake flow path 130 is reduced, a velocity of the air flowing into the compressor impeller 9 is increased. As a result, surging in the centrifugal compressor CC can be inhibited. In other words, the centrifugal compressor CC of the present embodiment can expand the operational range of the centrifugal compressor CC to the small flow rate area by forming the protruding position state.

In this manner, the first movable member 210 and the second movable member 220 are configured as a throttling member that throttles the intake flow path 130. In other words, in the present embodiment, the link mechanism 200 is configured as a throttling mechanism to throttle the intake flow path 130. The first movable member 210 and the second movable member 220 can change the flow path cross-sectional area of the intake flow path 130 by operating the link mechanism 200 by the drive controller 300.

Figure 7:
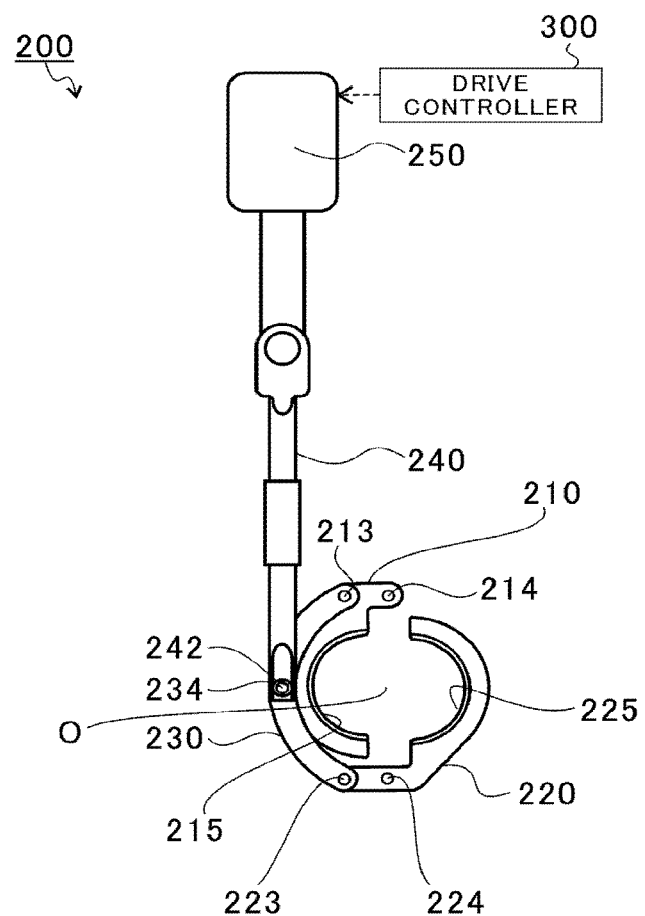
FIG. 7 is a second illustration of the operation of the link mechanism.
Figure 8:
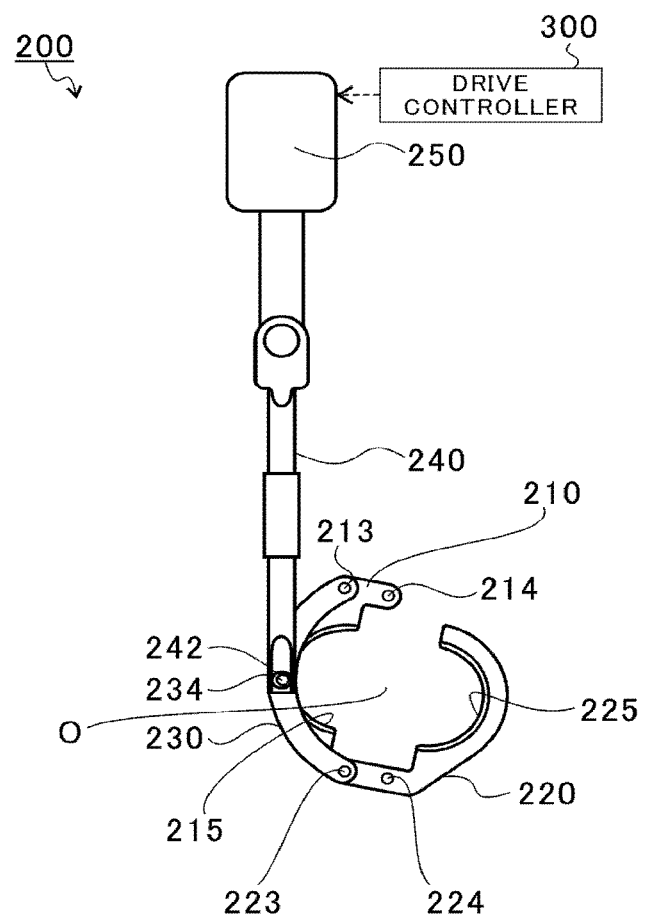
FIG. 8 is a third illustration of the operation of the link mechanism.

FIG. 7 is a second illustration of the operation of the link mechanism 200. FIG. 8 is a third illustration of the operation of the link mechanism 200. The actuator 250 linearly moves the rod 240 in a direction intersecting the rotational axis direction (up-and-down direction in FIGS. 7 and 8). The rod 240 moves upward from the state shown in FIG. 6. The amount of movement of the rod 240 relative to the arrangement shown in FIG. 6 is greater in the arrangement shown in FIG. 8 than in the arrangement shown in FIG. 7.

When the rod 240 moves, the connecting member 230 moves upward in FIGS. 7 and 8 through the rod connecting portion 234. In these states, the connecting member 230 is allowed to rotate around the rod connecting portion 234 as the center of rotation. There is a slight play in the inner diameter of the bearing hole 242 of the rod 240 relative to the outer diameter of the rod connecting portion 234. Therefore, the connecting member 230 is slightly allowed to move in the plane direction perpendicular to the rotational axis direction.

As described above, the link mechanism 200 is a four-bar linkage. The connecting member 230, the first movable member 210, and the second movable member 220 exhibit a behavior of one degree of freedom with respect to the first housing member 110. Specifically, the connecting member 230 slightly moves in the left-to-right direction while slightly rotating in the counterclockwise direction in FIGS. 7 and 8 within the above allowable range.

In the first movable member 210, the rotational shaft portion 214 is supported by the first housing member 110. The rotational shaft portion 214 is restricted from moving in the plane direction perpendicular to the rotational axis direction. The connecting shaft portion 213 is supported by the connecting member 230. Since the connecting member 230 is allowed to move, the connecting shaft portion 213 is movable in the plane direction perpendicular to the rotational axis direction. As a result, with the movement of the connecting member 230, the first movable member 210 rotates in a clockwise direction in FIGS. 7 and 8 around the rotational axis portion 214 as a rotation center.

Similarly, in the second movable member 220, the rotational shaft portion 224 is supported by the first housing member 110. The rotational shaft portion 224 is restricted from moving in the plane direction perpendicular to the rotational axis direction. The connecting shaft portion 223 is supported by the connecting member 230. Since the connecting member 230 is allowed to move, the connecting shaft portion 223 is movable in the plane direction perpendicular to the rotational axis direction. As a result, with the movement of the connecting member 230, the second movable member 220 rotates in a clockwise direction in FIGS. 7 and 8 around the rotational axis portion 224 as a rotation center.

Thus, the first movable member 210 and the second movable member 220 move in directions to separate from each other in the order of FIGS. 7 and 8. The protruding portions 215 and 225 move radially outward from the protruding position (retracted position). In the retracted position, for example, the protruding portions 215 and 225 are flush with the inner wall surface of the intake flow path 130 or are positioned radially outward from the inner wall surface of the intake flow path 130. When moving from the retracted position to the protruding position, the first movable member 210 and the second movable member 220 approach and contact with each other in the order shown in FIG. 8, FIG. 7, and FIG. 6. Thus, the first movable member 210 and the second movable member 220 switch between the protruding position and the retracted position according to the rotational angle around the rotational axis portions 214 and 224 as the rotation centers.

Thus, the first movable member 210 and the second movable member 220 are configured to be movable to the protruding position where they protrude into the intake flow path 130, and to the retracted position where they are not exposed (do not protrude) into the intake flow path 130. In the present embodiment, the first movable member 210 and the second movable member 220 move in the radial direction of the compressor impeller 9. However, the first movable member 210 and the second movable member 220 are not limited thereto, and may rotate around the rotational axis (circumferential direction) of the compressor impeller 9. For example, the first movable member 210 and the second movable member 220 may be shutter blades having two or more blades.

As shown in FIG. 2, in the retracted position, at least a part of the inner peripheral surfaces 211d and 221d (see FIG. 3) of the first movable member 210 and the second movable member 220 are spaced apart from the upstream slit 146 radially outward. When the first movable member 210 and the second movable member 220 are in the retracted position, the upstream slit 146 is opened, and the upstream slit 146 is connected to the communication hole 142 and the through holes 111 and 121.

Thus, when the first movable member 210 and the second movable member 220 are in the retracted position (hereinafter also referred to as a retracted position state), the circulation flow path 140 is formed by the communication hole 142, the downstream slit 144, and the upstream slit 146. In the retracted position, the protruding portions 215, 225 are retracted from the intake flow path 130 and the circulation flow path 140 is connected to the intake flow path 130.

When the flow rate of the air flowing into the compressor impeller 9 decreases, the circulation flow path 140 returns a part of the air circulating through the compressor impeller 9 to the upstream side of the compressor impeller 9. This increases the flow rate of the air on the upstream side of the compressor impeller 9, thereby inhibiting surging. Therefore, the centrifugal compressor CC of the present embodiment can expand the operational range of the centrifugal compressor CC to the smaller flow rate area by forming the retracted position state.

Since the first movable member 210 and the second movable member 220 do not protrude into the intake flow path 130 when they are in the retracted position, the pressure loss of the intake air (air) flowing through the intake flow path 130 can be minimized.

Figure 9:
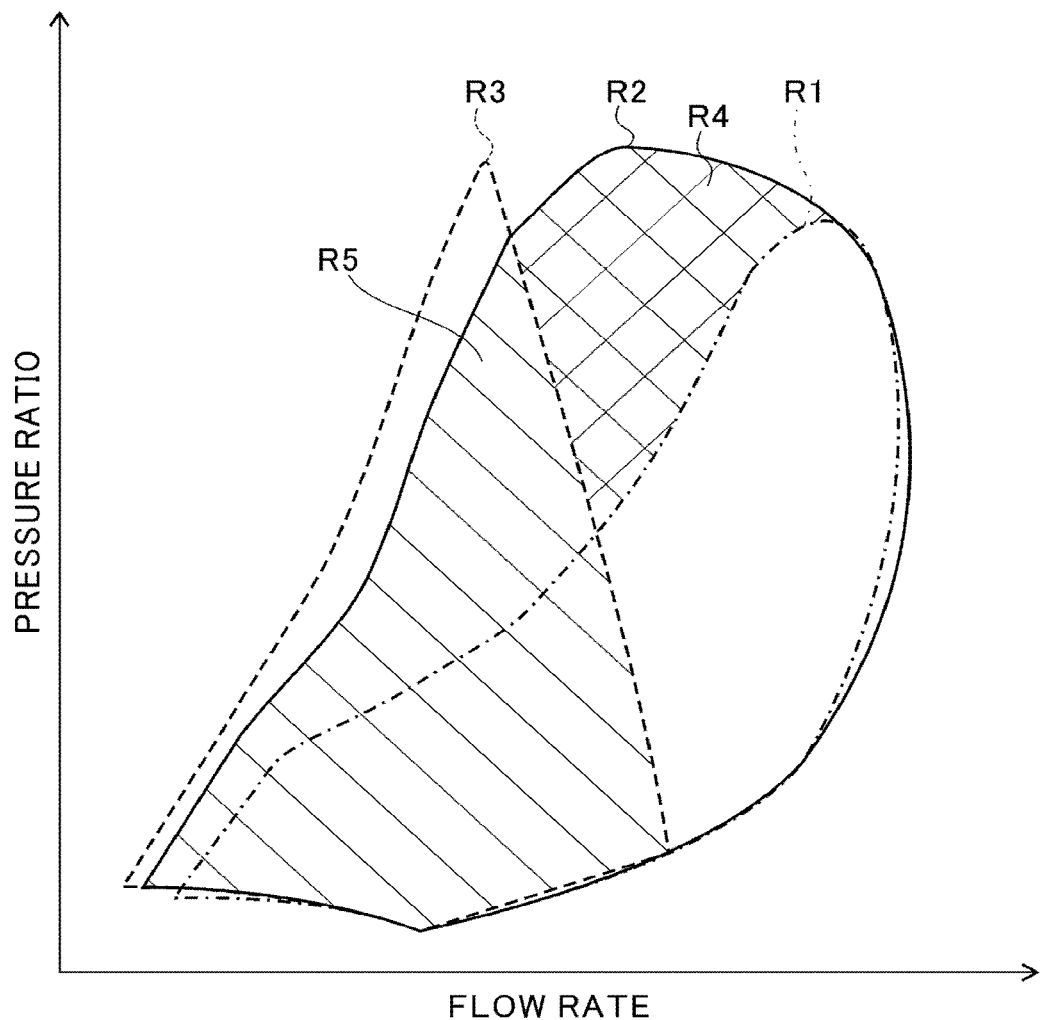
FIG. 9 shows an operational range of the centrifugal compressor.

FIG. 9 shows an operational range of the centrifugal compressor CC. In FIG. 9, the vertical axis shows a pressure ratio of the centrifugal compressor CC, and the horizontal axis shows a flow rate of the centrifugal compressor CC.

In FIG. 9, an operational range R1 of a conventional centrifugal compressor is shown by a single dotted chain line (i.e., when the circulation flow path 140 is not formed in the compressor housing 100). In FIG. 9, an operational range R2 of the centrifugal compressor CC in the retracted position state of the present embodiment is shown by a solid line. In FIG. 9, an operational range R3 of the centrifugal compressor CC in the protruding position state of the present embodiment is shown in a dashed line.

As shown in FIG. 9, the operational range R1 has a narrower operational range on the smaller flow rate area compared to the operational ranges R2 and R3. In other words, in the conventional centrifugal compressor (when the circulation flow path 140 is not formed in the compressor housing 100), surging tends to occur at the smaller flow rate area.

In contrast, the operational range R2 has a larger operational range on the smaller flow rate area compared to the operational range R1. In other words, the centrifugal compressor CC of the present embodiment can inhibit (reduce) surging that occurs at a small flow rate by forming the circulation flow path 140 in the compressor housing 100.

Furthermore, the operational range R3 has a larger operational range on the smaller flow rate area compared to the operational ranges R1 and R2. In other words, the centrifugal compressor CC of this embodiment can inhibit (reduce) surging that occurs at a small flow rate by throttling the intake flow path 130.

A case in which the link mechanism (throttling mechanism) 200 of the present embodiment is applied to a conventional centrifugal compressor will be described. In other words, a case in which the intake flow path 130 is throttled by the first movable member 210 and the second movable member 220 without forming the circulation flow path 140 in the compressor housing 100 of the present embodiment will be described.

In that case, as shown in FIG. 9, the operational range of the centrifugal compressor CC is shifted from the operational range R1 to the operational range R3.
Accordingly, the centrifugal compressor CC becomes unusable in a cross-hatched region R4 shown by the cross-hatching in FIG. 9.

In contrast, in the present embodiment, the intake flow path 130 is throttled in the protruding position while the circulation flow path 140 is formed in the compressor housing 100 in the retracted position state. In that case, as shown in FIG. 9, the operational range of the centrifugal compressor CC is shifted from the operational range R2 to the operational range R3. In this case, the centrifugal compressor CC can use the cross-hatched region R4 shown by the cross-hatching in FIG. 9.

Thus, the centrifugal compressor CC of the present embodiment can inhibit the operational range being suddenly changed, for example, a change from the operational range R1 to the operational range R3 by switching between the retracted position state (operational range R2) and the protruding position state (operational range R3). The centrifugal compressor CC of the present embodiment can use the cross-hatching region R4 by switching between the retracted position state (operational range R2) and the protruding position state (operational range R3), thereby expanding the operational range of the centrifugal compressor CC.

In the drive controller 300, an operational range map shown in FIG. 9 is stored in a memory (not shown). In the operational range map, values indicating an operational range in a protruding position state and a retracted position state of the centrifugal compressor CC are set. The drive controller 300 switches the first movable member 210 and the second movable member 220 between the retracted position and the protruding position by referring to the operational range map.

For example, in the operational range R2, the drive controller 300 moves the first movable member 210 and the second movable member 220 to the retracted position shown in FIG. 2. In the operational range R3, the drive controller 300 moves the first movable member 210 and the second movable member 220 to the protruding position shown in FIG. 4.

Since the circulation flow path 140 is formed in the operational range R2, the air returned by the circulation flow path 140 is mixed with the air flowing in the intake flow path 130, resulting in a mixing loss. As a result, the efficiency (compressor efficiency) of the centrifugal compressor CC is reduced. The air returned by the circulation flow path 140 has a larger flow rate on the smaller flow rate area. Therefore, in the operational range R2, the compressor efficiency decreases on the smaller flow rate area.

In contrast, in the operational range R3, the protruding portions 215 and 225 protruding into the intake flow path 130 cause a pressure loss of the air flowing through the intake flow path 130. As a result, the compressor efficiency of the centrifugal compressor CC is reduced. As described above, in the operational range R2, the compressor efficiency decreases on the smaller flow rate area. Therefore, in the overlapped region of the operational range R2 and the operational range R3 (a hatched region R5 shown by hatching in FIG. 9), the compressor efficiency of the operational range R2 is lower than that of the operational range R3 in the smaller flow rate area. Furthermore, in the hatched region R5, the compressor efficiency of the operational range R3 is lower than that of the operational range R2 in the larger flow rate area.

Therefore, the drive controller 300 of the present embodiment switches between the retracted position state (operational range R2) and the protruding position state (operational range R3) based on the compressor efficiency in the overlapped region of the operational range R2 and the operational range R3 (the hatched region R5 shown by hatching in FIG. 9).

In the operational range R3, the first movable member 210 and the second movable member 220 block the circulation flow path 140 (the upstream slit 146). Therefore, the amount of air returned from the upstream slit 146 to the upstream side of the compressor impeller 9 is reduced. Therefore, in the centrifugal compressor CC of the present embodiment, the mixing loss is reduced compared to the case where the protruding portions 215 and 225 protrude into the intake flow path 130 without blocking the circulation flow path 140. In this manner, in the centrifugal compressor CC of the present embodiment, the protruding position state shown in FIG. 4 can inhibit a decrease of the compressor efficiency.

A compressor efficiency map is stored in the drive controller 300 in a memory (not shown). In the compressor efficiency map, a value indicating a compressor efficiency that varies according to a flow rate (or an engine load) of the centrifugal compressor CC is set. The compressor efficiency map is set for each of the protruding position state and the retracted position state of the centrifugal compressor CC. The drive controller 300 switches between the retracted position state (operational range R2) and the protruding position state (operational range R3) in the hatched region R5 in FIG. 9 with reference to the compressor efficiency map.

For example, the drive controller 300 compares the compressor efficiency of the operational range R2 with the compressor efficiency of the operational range R3 in the hatched region R5. If the compressor efficiency of the operational range R2 is higher than that of the operational range R3, the drive controller 300 moves the first movable member 210 and the second movable member 220 to the retracted position shown in FIG. 2.

In contrast, when the compressor efficiency of the operational range R3 is higher than that of the operational range R2, the drive controller 300 moves the first movable member 210 and the second movable member 220 to the protruding position shown in FIG. 4.

As described above, the centrifugal compressor CC of the present embodiment comprises the drive controller 300. The drive controller 300 switches the first movable member 210 and the second movable member 220 between the retracted position and the protruding position based on the compressor efficiency. As a result, the centrifugal compressor CC can effectively inhibit a decrease of the compressor efficiency at a smaller flow rate.

Although the embodiments of the present disclosure have been described above with reference to the accompanying drawings, the present disclosure is not limited thereto. It is obvious that a person skilled in the art can conceive of various examples of variations or modifications within the scope of the claims, which are also understood to belong to the technical scope of the present disclosure.

In the above embodiment, an example of forming the depressions 211e, 221e on the inner peripheral surfaces 211d, 221d of the first movable member 210 and the second movable member 220 is described. However, the present disclosure is not limited thereto, and the depressions 211e, 221e may not be formed on the inner peripheral surfaces 211d, 221d of the first movable member 210 and the second movable member 220. However, the amount of movement of the first movable member 210 and the second movable member 220 in the radial direction can be reduced if the depressions 211e and 221e are formed, rather than if the depressions 211e and 221e are not formed. Therefore, it is preferable that the depressions 211e and 221e are formed in the first movable member 210 and the second movable member 220.

In the above embodiment, an example in which the drive controller 300 switches between the retracted position state and the protruding position state based on the compressor efficiency is described. However, the present disclosure is not limited thereto, and the drive controller 300 may prioritize either the retracted position state or the protruding position state. For example, the drive controller 300 may prioritize the protruding position state, and may always switch to the protruding position state in the hatched area R5 shown in FIG. 9

What is claimed is:

1. A centrifugal compressor comprising:
a housing including an intake flow path;
a compressor impeller disposed in the intake flow path;
a circulation flow path provided outside the intake flow path in a radial direction of the compressor impeller, and connected to the intake flow path at a downstream slit that radially faces the compressor impeller and at an upstream slit that is upstream of the downstream slit with respect to the compressor impeller, the upstream slit being defined by a wall surface of the housing that faces a leading edge of the compressor impeller in an axial direction of the compressor impeller to radially connect the circulation flow path with the intake flow path; and
a movable member disposed at the upstream slit and including a body portion having a protruding portion, the movable member being movable in the upstream slit between a protruding position where the circulation flow path is closed by the body portion and the protruding portion is located in the intake flow path, and a retracted position where the protruding portion is retracted from the intake flow path and the circulation flow path is connected to the intake flow path.

2. The centrifugal compressor according to claim 1, wherein the body portion includes a curved portion extending in a circumferential direction of the compressor impeller, and a depression is formed on an inner peripheral surface of the curved portion.

3. The centrifugal compressor according to claim 1, further comprising a drive controller for moving the movable member to the retracted position or the protruding position based on a compressor efficiency.

4. The centrifugal compressor according to claim 2, further comprising a drive controller for moving the movable member to the retracted position or the protruding position based on a compressor efficiency.

5. The centrifugal compressor according to claim 1, wherein when the movable member is in the retracted position, the protruding portion faces the leading edge of the compressor impeller in the axial direction of the compressor impeller.

* * * * *